(12) United States Patent
Murashko et al.

(10) Patent No.: US 10,880,231 B2
(45) Date of Patent: Dec. 29, 2020

(54) SYSTEMS AND METHODS FOR DETERMINING ROUTING INFORMATION FOR A NETWORK REQUEST

(71) Applicant: RINGCENTRAL, INC., Belmont, CA (US)

(72) Inventors: Ivan Viktorovich Murashko, Saint Petersburg (RU); Alexey Konstantinovich Radkov, Saint Petersburg (RU)

(73) Assignee: RingCentral, Inc., Belmont, CA (US)

( * ) Notice: Subject to any disclaimer, the term of this patent is extended or adjusted under 35 U.S.C. 154(b) by 4 days.

(21) Appl. No.: 16/367,833

(22) Filed: Mar. 28, 2019

(65) Prior Publication Data

US 2019/0222536 A1 Jul. 18, 2019

Related U.S. Application Data

(63) Continuation of application No. 15/152,727, filed on May 12, 2016, now Pat. No. 10,291,547, which is a
(Continued)

(51) Int. Cl.
*H04L 12/911* (2013.01)
*H04L 29/06* (2006.01)
(Continued)

(52) U.S. Cl.
CPC .......... *H04L 47/827* (2013.01); *H04L 65/00* (2013.01); *H04L 65/105* (2013.01);
(Continued)

(58) Field of Classification Search
CPC .................................................... H04L 47/827
See application file for complete search history.

(56) References Cited

U.S. PATENT DOCUMENTS

| 6,563,919 B1 | 5/2003 | Aravamudhan et al. |
| 2003/0036932 A1 | 2/2003 | Yukie |

(Continued)

FOREIGN PATENT DOCUMENTS

EP 2214383 8/2010

OTHER PUBLICATIONS

International Search Report from the International Searching Authority for International Application No. PCT/RU 2015/000301, dated Apr. 7, 2016 (2 pages).
(Continued)

*Primary Examiner* — Suraj M Joshi
(74) *Attorney, Agent, or Firm* — Finnegan, Henderson, Farabow, Garrett & Dunner LLP

(57) ABSTRACT

Systems and methods are disclosed for processing a request for network resources in a network comprising at least one endpoint a first pool of destinations. According to certain embodiments, a first request is received from an endpoint. A determination of whether to validate a first destination identifier associated with the first request is made based on at least one of a first timestamp and a first pool identifier associated with the first request. If it is determined to validate the first destination identifier, a target destination identifier is determined, and the first request is forwarded based on the target destination identifier. The requested network resource is received, and is transmitted to the endpoint.

20 Claims, 10 Drawing Sheets

Related U.S. Application Data continuation of application No. PCT/RU2015/000301, filed on May 15, 2015.

(51) Int. Cl.
   *H04L 29/08* (2006.01)
   *H04L 29/12* (2006.01)
(52) U.S. Cl.
   CPC ........ *H04L 65/1006* (2013.01); *H04L 67/327* (2013.01); *H04L 61/1529* (2013.01)

(56) References Cited

U.S. PATENT DOCUMENTS

| | | |
|---|---|---|
| 2003/0137991 A1 | 7/2003 | Doshi et al. |
| 2010/0191813 A1* | 7/2010 | Gandhewar ......... H04L 61/2015 709/206 |

OTHER PUBLICATIONS

Written Opinion from the International Searching Authority for International Application No. PCT/RU 2015/000301, dated Apr. 7, 2016 (5 pages).

\* cited by examiner

SYSTEMS AND METHODS FOR DETERMINING ROUTING INFORMATION FOR A NETWORK REQUEST

CROSS REFERENCES TO RELATED APPLICATIONS

This is a continuation of U.S. patent application Ser. No. 15/152,727, filed May 12, 2016 which is a continuation of PCT International Application No. PCT/RU2015/000301 filed May 15, 2015, the disclosure of which is incorporated herein by reference.

FIELD

The present disclosure relates to networking, and more specifically, to determining routing information for a network request.

BACKGROUND

Proxy server can act as an intermediary to in computer networks to route a network request (e.g., a Hypertext Transfer Protocol (HTTP) request or a Session Initiation Protocol (SIP) request, etc.) from a communication endpoint. As used herein, "communication endpoint" can be any client device that is capable of transmitting and receiving data over the computer networks, such as a personal computer (PC), a laptop, an IP (VoIP) phone, a mobile phone, etc. A communication endpoint seeking a network resource can transmit a network request to a server that provides resources. The communication endpoint can include in the request information specifying a server for forwarding the request after the communication endpoint receives network resources from that server. For example, each of Request For Comments (RFC) 2109 and 3261 provided by Internet Engineering Task Force (IETF) for HTTP and SIP requests, provides mechanisms for a server to pass routing information that represents a state of the connection (e.g., cookie) to the communication endpoint. The routing information can include the network location information (e.g., an IP address, a port number, etc.) of the server. The communication endpoint can store the routing information as state information. The communication endpoint can also retrieve the routing information from the stored state information and include the retrieved routing information in a subsequent request for network resources. A proxy server can then forward the subsequent request to the server.

However, at the time when the proxy server receives the subsequent request from the communication endpoint, the routing information may become invalid. For example, it is possible that an event has occurred during the time between the first request (from which the communication endpoint receives the routing information) and the second request, such that the proxy server can no longer use the network location information included in the request for forwarding the request.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

Figure 1:
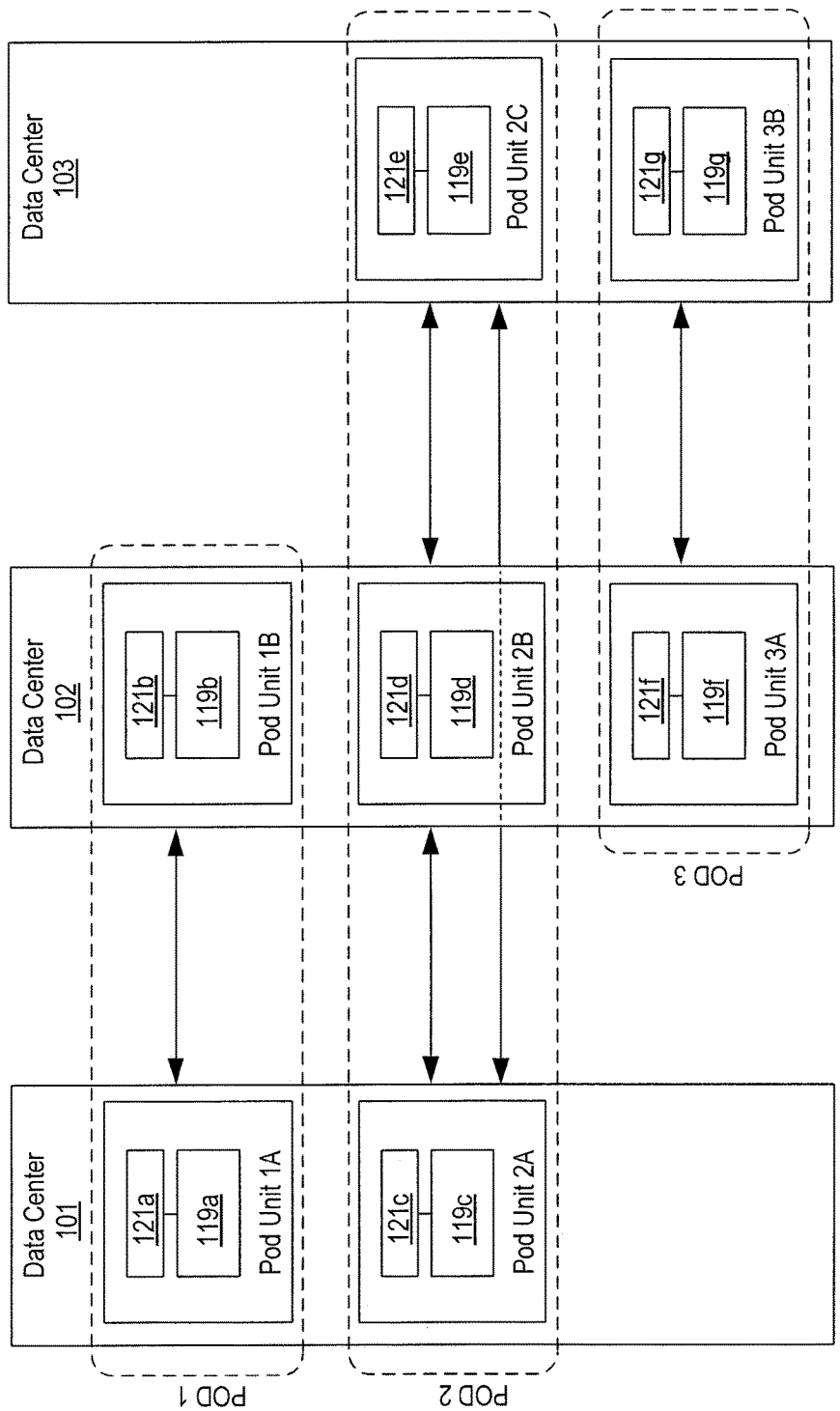
FIGS. 1 and 2 are diagrams of an example of a communication system in which various implementations described herein may be practiced.

A proxy server selects a destination to route a request that does not specify the network location or forwards a request according to the network location specified as part of the routing information included in the request. While forwarding requests saves computation and delay costs at the proxy server for the selection of a destination, in accordance with RFC 2109 and 3261, a request that includes a network location for the forwarding does not include other information that can indicate whether the network location remains valid. Thus, if the proxy server forwards the request to an invalid network location (e.g., a server that has been taken down for maintenance, or the server has been assigned with a different IP address and/or domain name, etc.) and fails to receive the requested network resources, the client device also will not receive the requested network resources from the proxy server, and user experience can be affected.

Reference will now be made in detail to methods and specific implementations that seek to overcome the foregoing shortcomings of current systems for processing network requests. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Methods, systems and computer program products are provided herein for processing a network request, and to improve the likelihood that the device that transmits the network request receives the network resources being requested. According to various implementations, a server (e.g., a proxy server) includes at least one processor that can receive a request from an endpoint. The request can include, for example, a request for network resource such as, for example, a HTTP request or a SIP request. The at least one processor may, in some embodiments, determine whether to validate a destination identifier associated with the request based on at least one of a timestamp and a pool identifier associated with the request. Responsive to the determination to validate the destination identifier, the one processor can, for example, determine a target destination identifier, and forward the request based on the target destination identifier.

The processor may also receive the requested network resource, and transmit the requested network resource to the endpoint.

With the embodiments of the present disclosure, the proxy server can determine, based on a timestamp or other information associated with the request, whether a network location specified in the request is potentially invalid. If the network location is determined to be potentially invalid, the proxy server can then validate the network location specified in the request based on, for example, pre-stored configuration and status information of the network location, and select a different destination to route the request. If the timestamp and other information associated in the request indicate that the network location is valid, the proxy server can then forward the request to the network location.

With the arrangements according to disclosed embodiments, the proxy server can detect potentially invalid network location information specified in the request and update the routing determination. User experience can also be improved with such arrangements, because the likelihood that the proxy server sends a request to an invalid network location (and fails to receive the requested network resources) can be reduced. Such arrangements are especially advantageous for applications that rely on asynchronous data transmission over the network where data is transmitted in spurts (versus synchronous data transmission, where data is sent in continuous packets). The arrangements according to disclosed embodiments can reduce the chance of service interruption caused by, for example, a change in the status of a server that provides the service between the data transmissions. A person with ordinary skill in the art will understand that such arrangements are also beneficial for synchronous networking as well.

The example embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples storage media include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium" can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 depicts an example of a communication system 100 in which a determination of routing information for a network request as described herein may be implemented.

As used herein, "routing information" refers to information related to routing. System 100 can be, for example, a telephony system such as a hosted Private Branch Exchange (PBX) platform that provides voice and video over IP, fax services, etc. In some examples, one or more components of communication system 100, such as data centers 101, 102, and 103, can be used to implement computer programs, applications, methods, processes, or other software to perform the described techniques and to realize the structures described herein. Communication system 100 includes data centers 101, 102, and 103. Each data center is a point of presence (POP) that includes the network computing resources (e.g., servers, routers, switches, network connections, storage devices, etc.) necessary to support the services provided by communication system 100. Each data center is typically located in a different geographical region.

In the example embodiment depicted in FIG. 1, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 2:
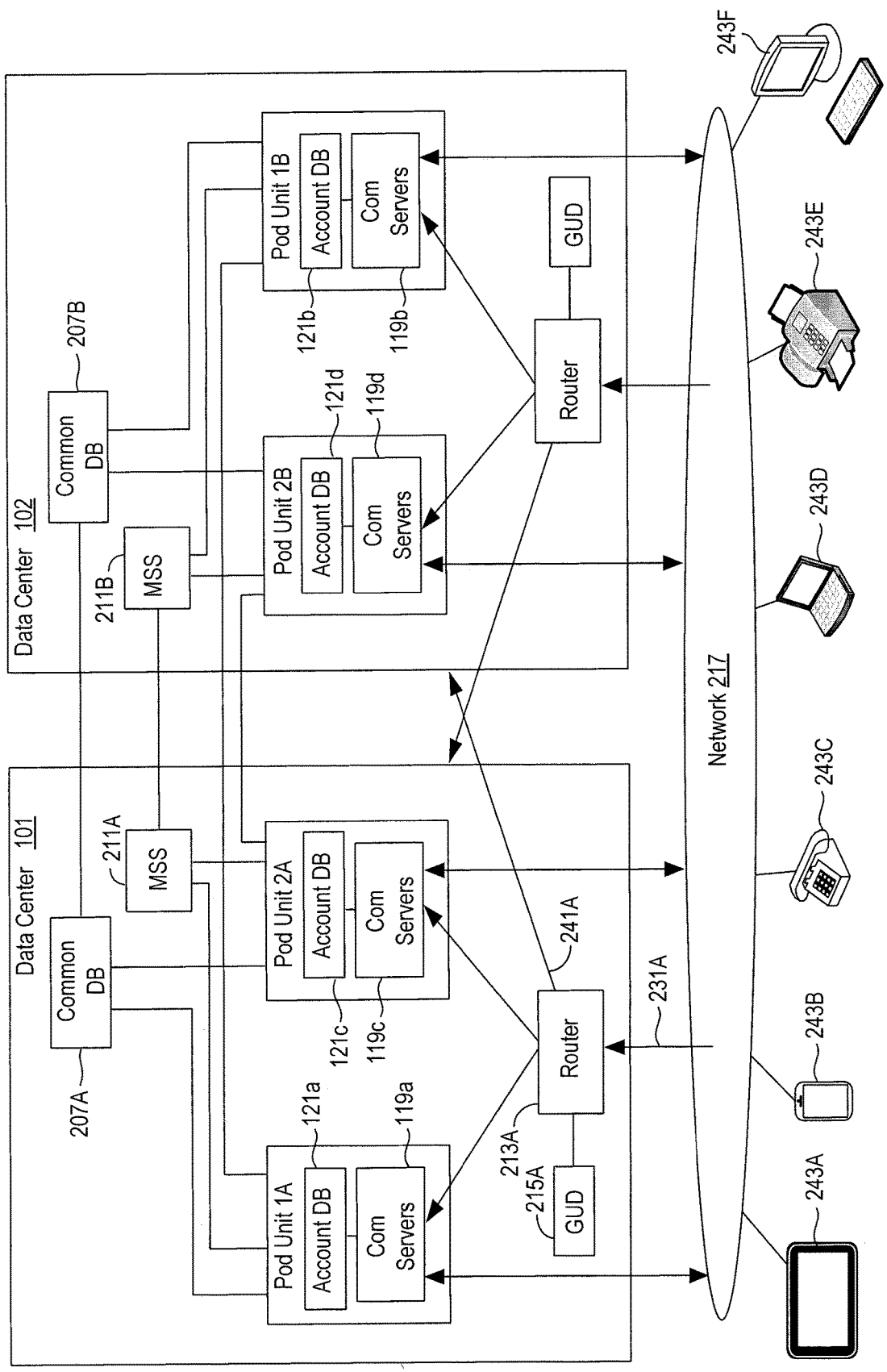

FIG. 2 shows various components of communication system 100 of FIG. 1. In some examples, one or more components of communication system 100, such as data centers 101 and 102, and/or communication endpoints 243A-243F can be used to implement computer programs, applications, methods, processes, or other software to perform the described techniques and to realize the structures described herein. Specifically, FIG. 2 shows the various interconnections within and between data centers 101 and 102. Both data centers are in communication with example network 217. Service requests from various communication endpoints 243A-243F are routed through network 217 to either or both of the data centers. Endpoints 243A-243F represent a diversity of client devices that connect with a services system designed in accordance with one or more implementations as described herein. Such client devices include, for example (and without limitation), cell phones, smart phones, tablets, laptop and desktop computers, conventional telephones, VoIP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure. As to be described later with respect to FIGS. 4-6, router 213A and GUD 215A can be configured to implement techniques described herein for determining routing information for a network request.

Communication servers 119a-d provide telecommunication services (e.g., voice, video, email, and/or facsimile) to subsets of users. Each of communication servers 119a-d may also provide other services including, for example, user account management and configuration, billing services, accounting services, etc. As to be described later, communication servers 119a-d provide network resources in response to receiving a service request 231A (e.g., a HTTP request, a SIP request, etc.) routed from router 213A. Each pod unit also includes an account database (e.g., account database 121a) to support the communication server(s) for that particular pod unit, storing configuration details and other information regarding each user's account. Communication server can be identified by a server identifier (e.g., an Internet Protocol (IP) address, a fully-qualified domain name, etc.). Each of communication servers 119a-d can also include a number of communication ports, with each communication port being dedicated to provide a specific subset of network resources. Each communication port can also be associated with a port identifier (e.g., a port number). A network location that provides a specific network resource (e.g., a certain port at communication server 119a) can be identified by a destination identifier that includes the server identifier and the port identifier.

Pod units 1A and 1B are in communication with one another so that the data on their respective account databases are synchronized across data centers. Data center 101 includes router 213A to receive incoming service request 231A from network 217. Router 213A parses the incoming service request to identify or extract a user key which can be used to identify a user. The incoming service can also include other information. For example, a SIP request can include a telephone number of the called party, and router 213A can parse the service request to extract the telephone number. From the telephone number, router 213A can determine, for example, a geographical location associated with the requested service.

Using the extracted information, router 213A can query GUD 215A to determine which pod is associated with the user key and/or with the geographical location. If the service request does not specify which destination to provide the service, router 213A also queries GUD 215A to acquire information about a pool of servers (e.g., communication servers 119a) that are configured to provide the requested service to the user associated with the user key (and/or with the geographical location), and then select a server (and the associated pod) to route the request. Once the server is selected, the associated destination identifier information can be generated, and router 213A routes the service request according to the destination identifier information. Depending on the destination identifier, and which of the pod units and data centers are associated with the network location that is associated with the destination identifier, router 213A may route the service request to data center 101, or another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119a-d. Different versions of the applications data may be stored in common database 207A which allow changes and upgrades to communication servers 119a-d to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

Figure 3:
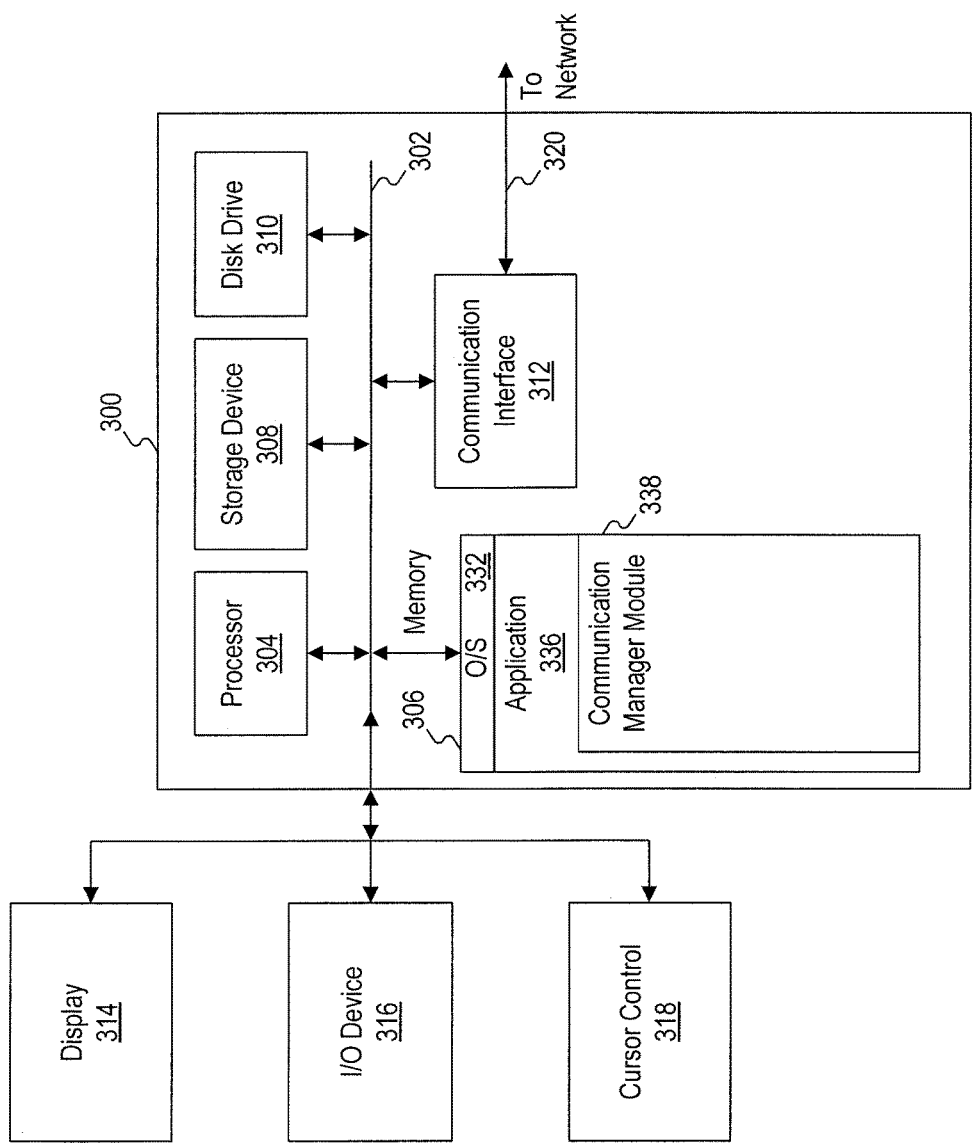
FIG. 3 is a diagram of an example of a system architecture for implementing embodiments consistent with the present disclosure.

FIG. 3 is a block diagram of an example of system 300. System 300 can be part of a communication device used in a communication system, which can function as any of the communication devices depicted in FIG. 2 (e.g., communication endpoints 243A-243F of FIG. 2), and can be configured to provide a request for network resources which can be processed by a proxy server (e.g., router 213A of FIG. 2) with techniques consistent with embodiments of the present disclosure. System 300 can also be implemented as part of router 213A of FIG. 2 to perform the techniques consistent with embodiments of the present disclosure.

System 300 includes a bus 302 or other communication mechanism for communicating information, which interconnects subsystems and devices, such as one or more processors 304, system memory ("memory") 306, storage device 308 (e.g., ROM), disk drive 310 (e.g., magnetic or optical), communication interface 312 (e.g., a modem, Ethernet card, or any other interface configured to exchange data with a communications network), display 314 (e.g., CRT or LCD), input device 316 (e.g., keyboard), and pointer cursor control 318 (e.g., mouse or trackball).

According to some examples, computer system 300 performs specific operations in which processor 304 executes one or more sequences of one or more instructions stored in system memory 306. Such instructions can be read into system memory 306 from another computer readable medium, such as static storage device 308 or disk drive 310. In some examples, hard-wired circuitry can be used in place of or in combination with software instructions for implementation. In the example shown, system memory 306 includes modules of executable instructions for implementing an operation system ("O/S") 332, an application 336, and a communication manager module 338, which can provide the functionalities disclosed herein.

In some examples, execution of the sequences of instructions can be performed by a single computer system 300. According to some examples, two or more computer systems 300 coupled by communication link 320 (e.g., links to LAN, PSTN, or wireless network) can perform the sequence of instructions in coordination with one another. Computer system 300 can transmit and receive messages, data, and instructions, including program code (i.e., application code) through communication link 320 and communication interface 312. Received program code can be executed by processor 304 as it is received, and stored in disk drive 310, or other non-volatile storage for later execution.

In some examples, where system 300 is part of a communication device (e.g., communication endpoints 243A-

243F of FIG. 2), application 336 is configured to submit a request for network resources (e.g., a HTTP request, a SIP request, etc.), via communication link 320, to router 213A of FIG. 2. Application 336 can also receive a response including the requested network resources from router 213A. Application 336 can also acquire routing information from the data included in the response. The routing information can include, for example, a timestamp, information on a pool associated with a network location that provides the response, and a destination identifier associated with the network location. Application 336 can then store the routing information in disk drive 310 and/or memory 306. When application 336 generates another request, application 336 can retrieve the stored routing information and include the routing information with the request, or associate the routing information with the request in other manners. The routing information, including the destination identifier, enables router 213A to either use the routing information in this request to forward the request, or to determine new routing information. Router 213A then forwards the request either to a network location specified in the request, or to a newly-determined network location.

In some examples, where system 300 is part of a proxy server and/or a routing device (e.g., router 213A of FIG. 2), application 336 can be configured to receive a request (e.g., a HTTP request, a SIP request, etc.). Application 336 can use the routing information in the request (if included), or determine new routing information. Application 336 can also interact with an external database (e.g. GUD 215A of FIG. 2) through bus 302 to acquire configuration and status data of other servers that are configured to process the request. Application 336 can then determine the routing information based on the acquired data. System 300 can then forward the request either to a network location specified in the request or to a newly-determined network location via communication interface 312.

Figure 4:
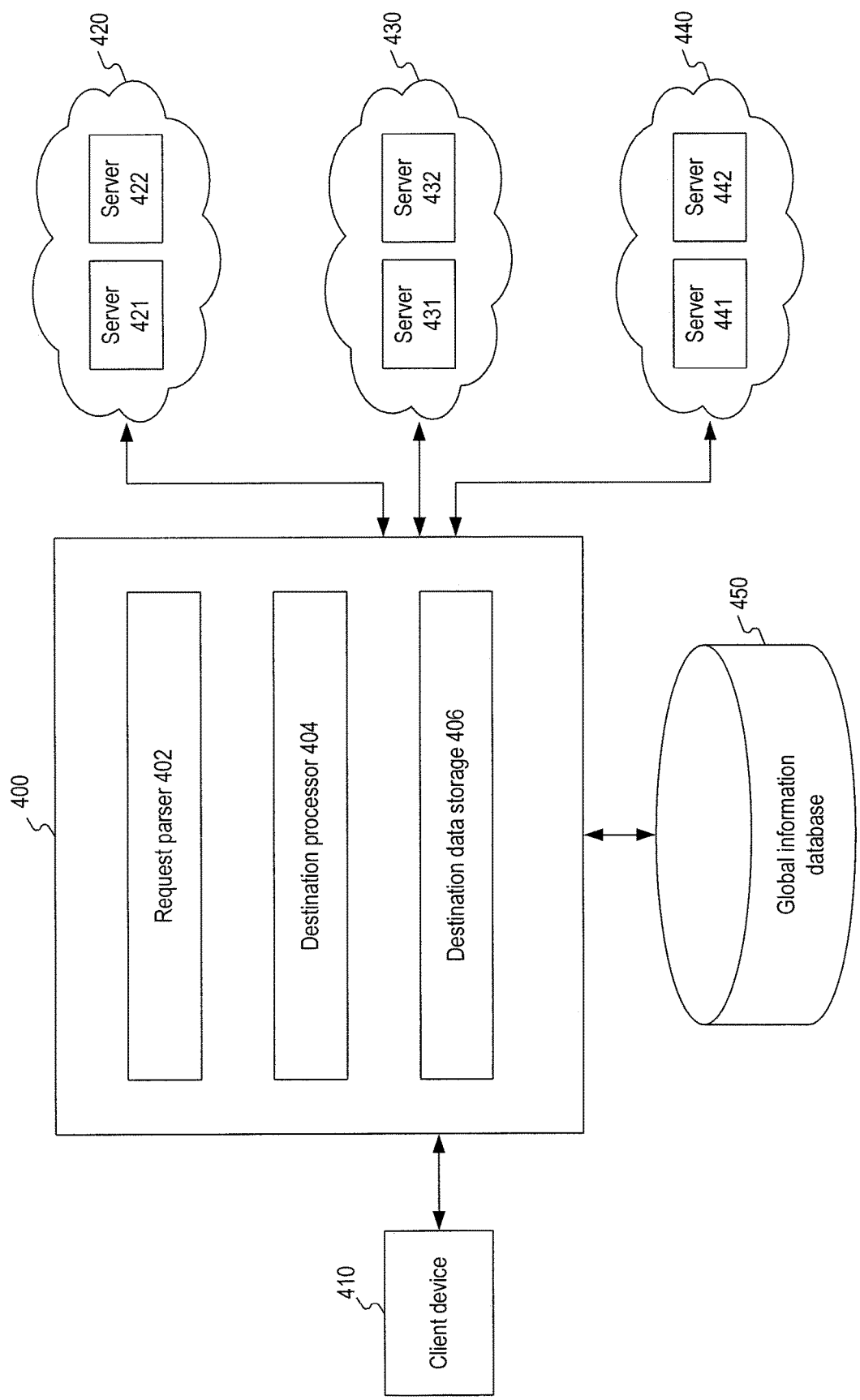
FIG. 4 is a block diagram of an example of a proxy server for determining routing information for a network request, consistent with disclosed embodiments.

FIG. 4 is a simplified block diagram of an example of a proxy server 400 for determining routing information for a network request, consistent with disclosed embodiments. As shown in FIG. 4, proxy server 400 is communicatively coupled with a client device 410 (via, for example, network 217 of FIG. 2). Proxy server 400 is also communicatively coupled with a plurality of server pools 420, 430, and 440. Proxy server 400 is also communicatively coupled with global information database 450. In some embodiments, proxy server 400 can implement at least some of the functionalities of router 213A of FIG. 2, while global information database 450 can implement at least some of the functionalities of GUD 215A of FIG. 2.

Each of server pools 420-440 includes a plurality of servers. Server pool 420 includes servers 421 and 422, server pool 430 includes servers 431 and 432, and server pool 440 includes servers 441 and 442. The servers can be organized into pools to reflect one or more common attributes shared by the servers. For example, each server pool can be dedicated to provide a set of network resources (e.g., media processing resources, web hosting, etc.), to provide a type of service (e.g., web browsing, VoIP communication, etc.), etc. Each server pool can also be dedicated to a group of users, and/or to serve communities located in a specific geographical location. In some cases, a server pool can include a set of servers associated with different data centers of FIG. 2 (e.g., communication servers 119a and 119d of FIG. 2 can belong to the same server pool).

Each server pool can be associated with a pool label. A pool label or identifier can be any arbitrary combination of numbers and symbols. For simplicity and illustration purpose, throughout this disclosure, server pool 420 is associated with a pool label "420," server pool 430 is associated with a pool label "430," and server pool 440 is associated with a pool label "440." A server pool can also be associated with an active status, meaning that all of the servers within the server pool are capable of responding to requests, or an inactive status, meaning that none of the servers within the server pool responds to the requests. The status of a server pool can change between active and inactive in so-called "switchover" situations. For example, a server pool can become inactive when an active pool of servers becomes out of service due to, for example, network and hardware problems, and another active server pool is dynamically assigned as a replacement. In some cases, a server pool can also be designated as an inactive backup server pool with identical configurations as an active server pool. When the active server pool is taken down for updating and/or maintenance, the backup server pool can be activated to an active status to replace the taken-down server pool. As to be described below with respect to FIG. 5, the active and inactive statuses of a server pool can be represented by categorizing a server pool label according a status.

Each of servers 421, 422, 431, 432, 441, and 442 has an associated server identifier (e.g., an IP address, a fully-qualified domain name, etc.). Each of the servers can be part of or the entirety of one of communication servers 119a-d of FIG. 2, and can include a number of communication ports, with each communication port being dedicated to provide a specific subset of network resources. Each communication port is associated with a port identifier (e.g., a port number). Each server can host a destination for a request. The destination can be identified by a destination identifier, which may include a combination of a server identifier and a port identifier.

Global information database 450 stores the destination identifier information (e.g. IP address and port number) of the destinations hosted by the servers, as well as their associated configuration and status data. The configuration and status data can include, for example, an operational status of each of at least one of servers 421, 422, 431, 432, 441, and 442 (e.g., whether it is responsive to a request), the kind of network resources the server supports (e.g., whether it is a media server providing media resources, whether it is a HTTP server, etc.), whether the server is dedicated to a specific user, the latest workload of the server, etc. In some embodiments, global information database 450 collects the configuration and status data from the servers periodically, so that the data stored in global information database 450 can reflect changes in the operation status of the servers. And in some embodiments, global information database 450 provides at least part of the data periodically to proxy server 400. Proxy server 400 can then use the data to determine routing information of a request, as to be described below. In some cases, as described below, proxy server 400 can also query global information database 450 to acquire the data in response to receiving a request.

Figure 5:
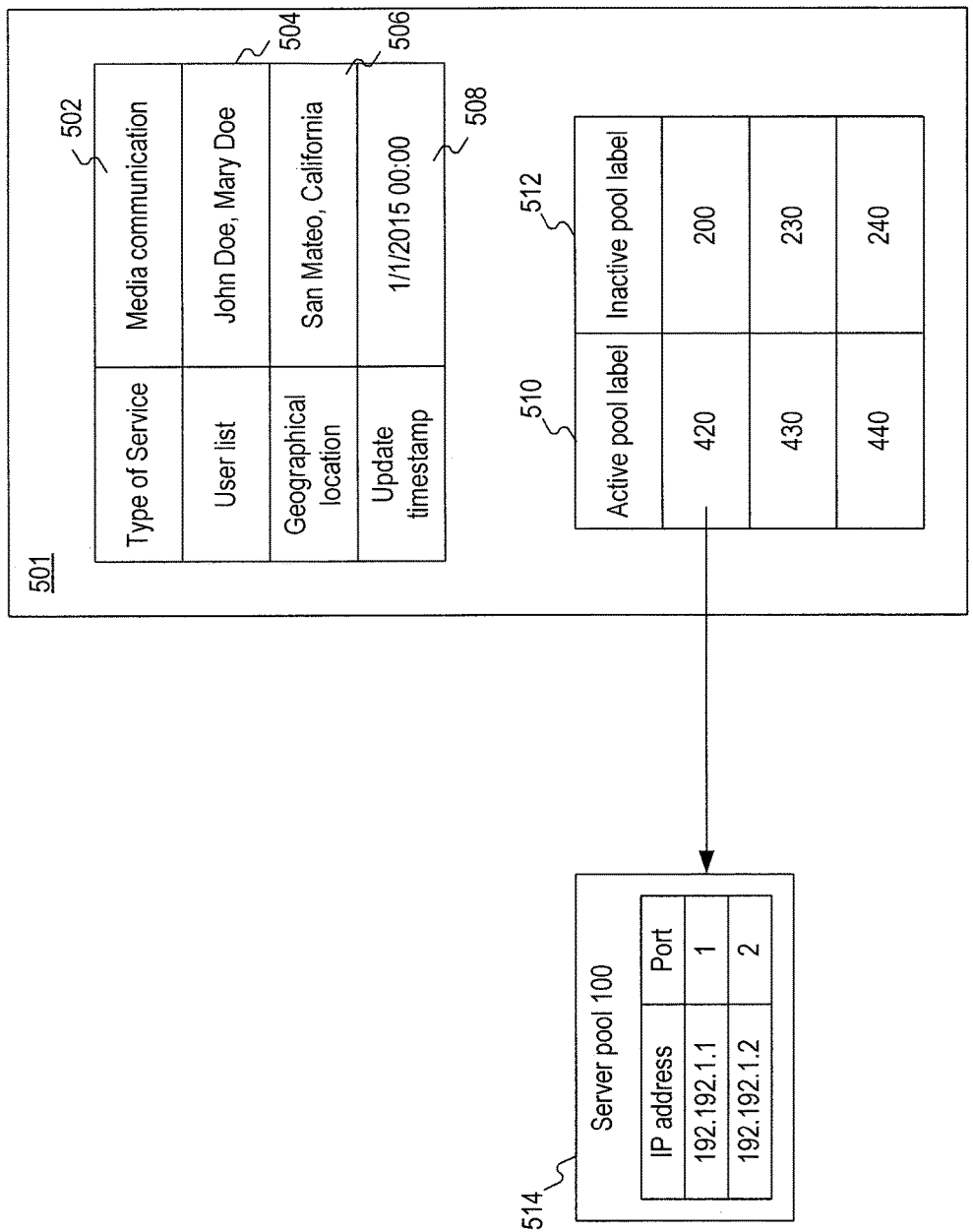
FIG. 5 illustrates an example of data structure for storing and organizing network resource destinations information, consistent with disclosed embodiments.

In some embodiments, the configuration and status data is hierarchically organized for efficient retrieval, although other organizations may also be used and may also support efficient retrieval. Reference is now made to FIG. 5, which illustrates an example of data structure 500 for storing and organizing network resource destinations information, consistent with disclosed embodiments. As shown in FIG. 5, data structure 500 includes table 501, which stores a type of service entry 502, a user-list entry 504, a geographical location entry 506, an update timestamp entry 508, one or more active pool label entries 510 and inactive pool label entries 512.

Table 501 associates one or more active server pools (specified in active pool label entries 510) with a type of service specified in type of service entry 502, a list of users specified in user-list entry 504, and a geographical location specified in geographical location entry 506. For example, as shown in FIG. 5, the servers of server pools 420, 430, and 440 are configured to provide media communication service to a list of users (e.g., John Doe and Mary Doe) located in San Mateo, Calif. When a request includes information that are associated with these entries (e.g., a SIP request indicating that media communication resource is requested, a user key that belongs to John Doe, a phone number that indicates the called party is located in San Mateo, Calif., etc.), servers from server pools 420, 430, and 440 can be designated to provide the requested service.

Each active pool label stored in active pool label entries 510 is associated with a set of destination identifiers. For example, as shown in FIG. 5, the entry of server pool label "420" is linked to a table 514, which stores network location information including the IP addresses of, for example, servers 421 and 422, and their associated port numbers. In some embodiments (not shown in FIG. 5), table 514 can also store the status and configuration data associated with each of the servers (or destinations) represented by the destination identifiers.

The configuration and status data organized in data structure 500, such as the associations between a server pool with type of service and user list, the associations between a server pool and the servers, the status of a server pool (e.g., whether it is active or has become inactive), etc., are dynamically updated by global information database 450. This update can be in response to detecting configuration and status changes of the servers (e.g., some servers associated server pool 420 have been taken down, and the disabled servers are removed from table 514), changes in user account settings (e.g., changes in account database 121a of FIG. 2 indicate that John Doe is no longer allowed to use the active server pools listed in active pool label entries 510), etc. When a particular server pool is updated, the associated update timestamp entry 508 will store a timestamp reflecting the time when the update occurs. In the presently described embodiment, when proxy server 400 acquires the configuration and status data (organized with a data structure similar to data structure 500) from global information database 450, the update timestamp entry 508 stored at proxy server 400 can also reflect the time of acquisition. The update timestamp can be used in some embodiments by proxy server 400 to determine whether the network location information included in a request is up-to-date, and accordingly, whether the information is potentially invalid. Although FIG. 5 shows that update timestamp entry 508 is associated the group of active server pools 420, 430, and 440, in some embodiments, update timestamp entry 508 can also be used to indicate an update event with respect to all the data stored at proxy server 400, and need not be associated with a particular set of server pools (or with a type of service, a user list, a geographical location, etc.) as shown in FIG. 5.

In some embodiments, as shown FIG. 5, each of active pool label entries 510 is also associated with a corresponding inactive pool label entry 512. As discussed above, a server pool can become inactive in the aforementioned switchover situation. In that case, table 501 supports association of the replacement active server pool label and the inactive server pool label to reflect the switchover situation, and the association can be updated to reflect new switchover events. Thus, if in some instances proxy server 400 receives a request that includes a pool label associated with a network location, and upon determining that the server pool label is associated with an inactive server pool based on inactive pool label entries 512 (e.g., proxy server 400 receives a request that includes a server pool label "200"), proxy server 400 can use table 501 to locate a replacement server pool (e.g., server pool 420), and select a destination from the associated table of destination identifiers (e.g. table 514) for routing the request. Update timestamp 508 is also updated to reflect the time when the association between active pool label entries 510 and inactive label entries 512 is updated. In some embodiments, the pairing of active pool label entries 510 and inactive label entries 512 may be associated with a separate timestamp (not shown in FIG. 5) that is configured to reflect only the time of switch-over.

Referring back to FIG. 4, client device 410 can be any of the communication devices depicted in FIG. 2 (e.g., communication endpoints 243A-243F of FIG. 2). Client device 410 can communicate with any of servers 421, 422, 431, 432, 441, and 442 via proxy server 400. The communication can include the client device 410 transmitting a request for network resources (e.g., a HTTP request, a SIP request, etc.) to the server, and the server transmitting a response including the requested network resources back to client device 410. Proxy server 400 can facilitate the communication between client device 410 and any of the servers 421,422, 431,432, 441, and 442, by receiving the request from client device 410, routing the request to one of the servers, receiving a response including the requested network resources from the server, and then forwarding the response back to client device 410. Proxy server 400 includes a request parser 402, a destination processor 404, and a destination data storage 406.

Request parser 402 is configured to, for example, extract information included in a request, which proxy server 400 can then use to determine the destination for the routing of the request. In some embodiments, the request includes routing information for routing the request. The routing information may include a destination identifier (i.e. an IP address of a server and a port number), a pool label associated with a server pool that includes the server specified for the destination, and a timestamp that reflects a time when the routing information is generated or updated. In some embodiments, the request does not include the routing information. The request may include other information, such as type of a type of network resource requested (e.g., whether it is a HTTP request), a user identifier (e.g. user key as described in FIG. 2), other information that can be used to determine a geographical location (e.g., a phone number included in a SIP request), etc. Request parser 402 can parse the request, and extract the aforementioned information included in the request.

Destination processor 404 is configured to, for example, determine the routing information, which includes the destination identifier for routing the request based on the information extracted by request parser 402. Destination processor 404 can determine the routing information when such information is absent in the request, as indicated by request parser 402, or when destination processor 404 determines that the routing information in the request is invalid, as to be discussed below. Destination data storage 406 stores data that include, for example, configuration and status data of the servers (e.g., as reflected in data structure 500 of FIG. 5) acquired from global information database 450. The stored data can be used by destination processor 404 to determine the routing information; After destination processor 404 determines the routing information (and the destination identifier included), proxy server 400 can transmit the request to the server associated with the destination identifier. Proxy server 400 may receive a response including the requested network resources from the server. After receiving the response, proxy server 400 can return the routing information, with the response from the server, to client device 410. The client device can include the routing information in a subsequent request for network resource. The methods implemented by destination processor 404 for determining the routing information for routing a request are to be discussed below with respect to FIGS. 6-9. In some embodiments, proxy server 400 is configured to also encrypt the routing information before transmitting it to client device 410, to avoid the routing information being intercepted by a third party.

Figure 6:
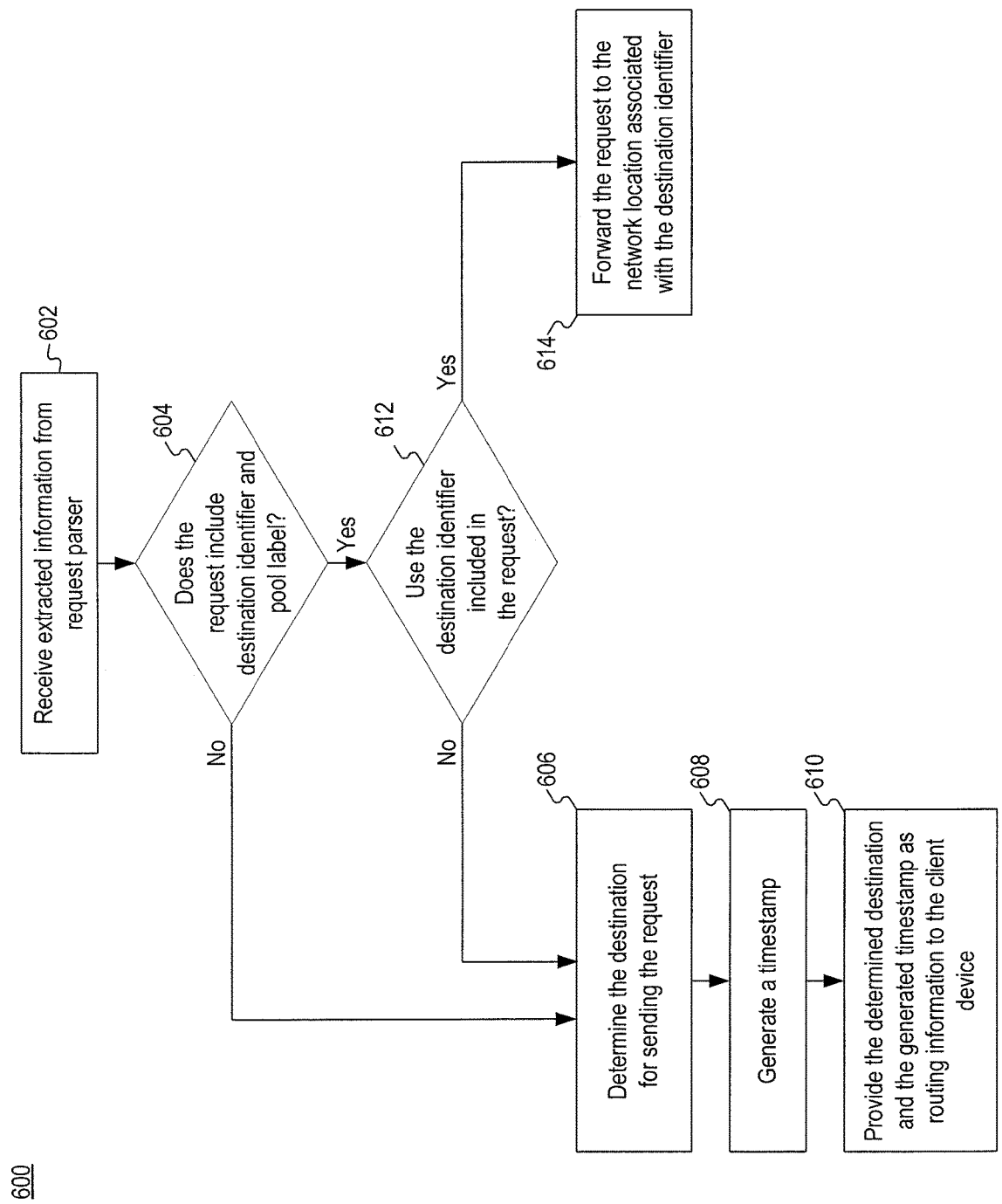
FIG. 6 is a flow chart illustrating an example of a method for determining routing information for a network request, consistent with disclosed embodiments.

Reference is now made to FIG. 6, which illustrates an example of method 600 for determining routing information for a network request. Method 600 can be implemented by destination processor 404, for determining the routing information of a network request consistent with embodiments of the present disclosure. Referring to FIG. 6, it will be readily appreciated that the illustrated procedure can be altered to delete steps or further include additional steps. While the methods are described as being performed by proxy server 400, and in particular, destination processor 404, it is appreciated that other components of proxy server 400 or other devices can be involved.

As shown in FIG. 6, after receiving extracted information from request parser 402 (step 602), destination processor 404 determines whether the request includes routing information which includes a destination identifier and a pool label (step 604). Destination processor 404 may generate new routing information, by first determining the destination for the request (step 606), if the request does not include either the destination identifier or the pool label.

The determination of the destination in step 606 can be based on both the information extracted from the request (e.g., a type of request, a user key, etc.) and the server information stored at destination data storage 406. As an illustrative example, referring back to FIG. 5, if the request indicates that the type of service requested is for media communication, and includes a user key associated with the user John Doe and a phone number indicating that the called party is in San Mateo, Calif., one of active server pools 420, 430, and 440 can be retrieved from table 501. From the server pool (e.g., server pool 420), a destination identifier (e.g., IP address 192.192.1.1, port number 1) associated with server 421 can be retrieved from table 514. Destination processor 404 can then use the retrieved destination identifier for routing the request. The selection of active server pool and destination identifier in this illustrative example can be made according to any suitable algorithm. For example, destination processor 404 can employ a round-robin mechanism to cycle through each active server pool and the associated servers when determining which server to process a request, to more evenly distribute the load.

In some cases, the determination of destination in step 606 can also be based on server configuration and status data stored at global information database 450. For example, if destination processor 404 cannot find a server pool that is associated with the type of service, the user key, and/or the location included in the request, destination processor 404 can query global information database 450 with the information extracted from the request, such as a type of service, an user key, a location, etc., to acquire information about an active server pool (and the associated servers) configured to provide the type of service to the user specified in the request. Destination processor 404 will then update destination storage 406 with the acquired server pool information.

After determining the destination for sending the request in step 606, destination processor 404 generates a timestamp (step 608). The timestamp can be associated with the determined destination as part of routing information. The timestamp can reflect a time when the routing information is generated or updated. Destination processor 404 then provides the routing information, including the timestamp generated in step 608, to the client device that transmits the request (step 610). The client device can store the routing information as part of a state information that represents a state of connection with the server. The client device can then retrieve the routing information and include that in a subsequent request for network resources.

When receiving a subsequent request that includes the routing information, destination processor 404 can use the timestamp included in the routing information to determine whether the routing information is potentially invalid. Upon determining that the routing information is potentially invalid, destination processor 404 can generate new routing information by first executing step 606 again to determine the destination for sending the request, rather than using the destination identifier in the routing information.

After the client device transmits the subsequent request, which is then parsed by request parser 402 to extract the routing information, destination processor 404 receives the extracted information (in step 602). Destination processor 404 can then determine whether to use the destination identifier included in the request (in step 612). The determination can be based on the timestamp included in the request.

As discussed above, it is possible that an event has occurred during the time between a prior communication (from which the client device receives the routing information) and when the subsequent request is transmitted, such that the proxy server can no longer use the routing information to forward the request. For example, after the prior communication occurred, the server specified in the request became incapable of providing the requested network resources. Moreover, there can also be other configuration changes. For example, after the prior communication occurred, the servers associated with a particular server pool were updated (e.g., a server is added to or removed from a server pool). The server identifier (e.g. IP address) associated with a server can also have changed. The routing information will not reflect these events if it is generated or updated before the servers' configuration and status data (as stored in global information database 450 and/or destination data storage 406) is updated to reflect these events.

To detect the potential invalidity of routing information, destination processor 404 can compare, for example, the timestamp included in the request, which reflects the time when the routing information is generated or updated (e.g., proxy server 400 acquires an active server pool label or a destination identifier from either destination data storage 406 or global information database 450), against update timestamp entry 508 as stored in data storage 406, which reflects the time when the servers' configuration and status data is updated or generated. Based on a relationship between the two timestamps (e.g., if the timestamp included in the request is earlier than the update timestamp by certain amount of time), destination processor 404 can determine that the routing information included in the request is stale and is potentially invalid. Destination processor 404 may determine not to use the destination identifier included in the request (step 612), and proceed to step 606 to determine a new destination. A new timestamp will be generated (in step 608) to reflect the time when new routing information is generated. The new destination and new timestamp will then be provided to the client device as part of updated routing information (in step 610).

In some embodiments, if, based on the relationship between the two timestamps, destination processor 404 determines that the routing information included in the request is up-to-date (e.g., valid), destination processor 404 can determine to use the destination identifier included in the request (in step 612). Destination processor 404 can then forward the request to the network location associated with the destination identifier (in step 614).

With such arrangements, destination processor 404 can detect potentially invalid network location information specified in the request, and update the routing determination accordingly. User experience can also be improved with such arrangements, since the likelihood that the proxy server sends a request to an invalid network location can be reduced, while the efficiency achieved with using routing information for forwarding a request can also be largely maintained.

Figure 7:
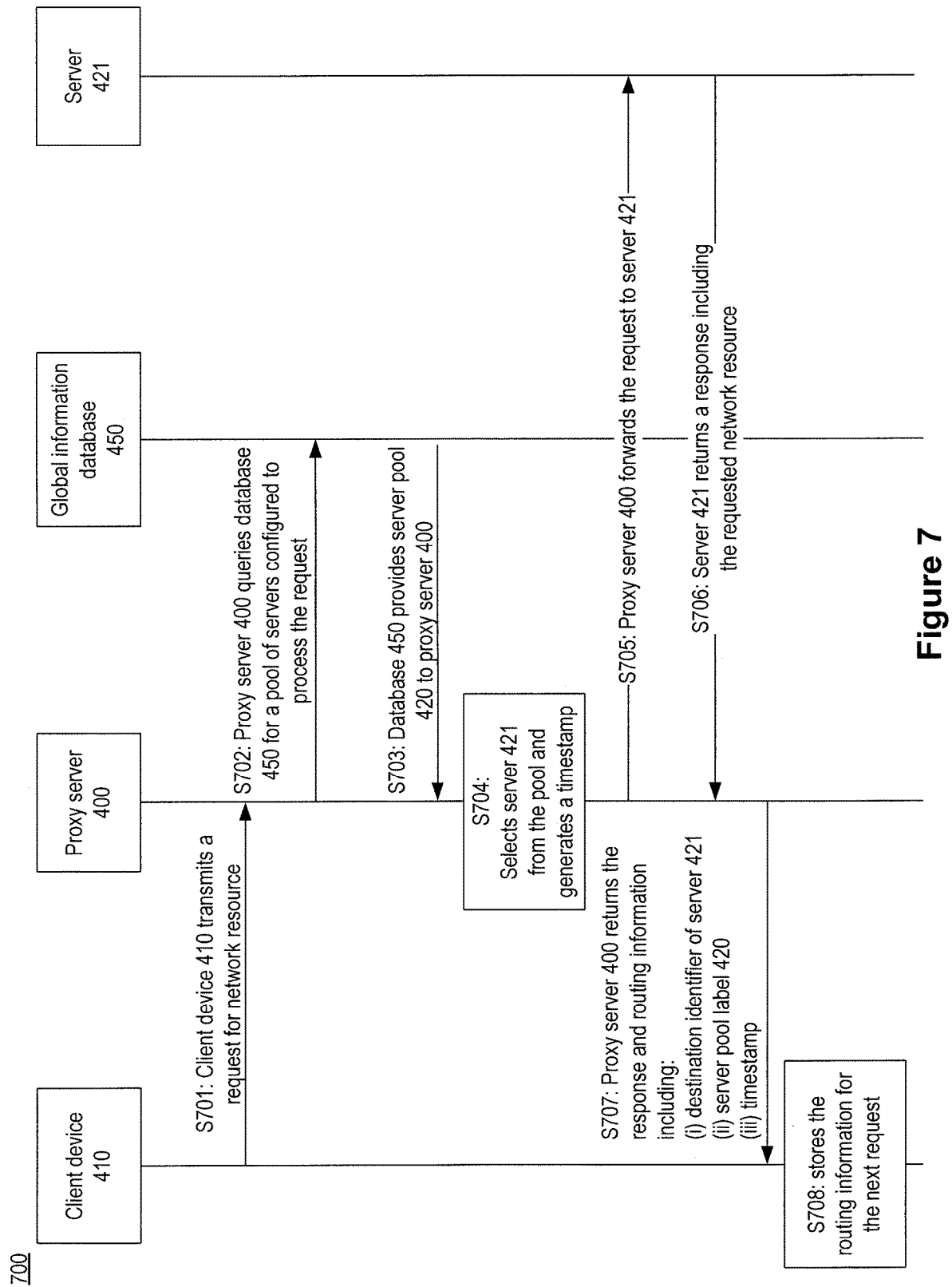
FIG. 7-10 are message flow charts illustrating examples of a method for processing a network request, consistent with disclosed embodiments.

Reference is now made to FIG. 7, which illustrates an example method 700 for processing a network request. Method 700 can be implemented among client device 410, proxy server 400, global information database 450, and server 421 of FIG. 4, for processing a network request that does not include routing information, consistent with embodiments of the present disclosure. It is understood that the components involved in method 700 are provided only for illustration purpose, and that method 700 can be implemented between any suitable devices.

In step S701, client device 410 transmits a request for network resource to proxy server 400. The request does not include routing information, and the request also does not include a destination identifier which would have enabled proxy server 400 to forward the request.

In step S702, upon determining that the request does not include routing information, proxy server 400 can query global information database 450 for a server pool configured to process the request. The query can include information extracted from the request, such as the type of service requested, the user key associated with the request, the geographical location associated with the requested network resources, etc. Global information database 450 can store the associations among server pools, type of service requested, and users, using a data structure similar to data structure 500 of FIG. 5.

In step S703, based on the information provided in the query, database 450 provides, to proxy server 400, information about a server pool that is configured to provide the requested service or resource. The information includes a server pool label associated with the server pool, a list of destination identifiers (e.g. a combination of server identifier and port identifier) associated with the server pool, etc. As an illustrative example, proxy server 400 can provide the server pool label "420," which is associated with server pool 420.

In step S704, proxy server 400 selects a server (e.g., server 421) from the list of destination identifiers associated with the server pool (e.g., server pool 420), and generates a timestamp. As discussed before, proxy server 400 can select a server using any suitable algorithm, such as a round-robin mechanism to distribute the load more evenly. The timestamp reflects a time when the destination identifier is selected for generation of the routing information, and can be used by proxy server 400 to determine whether the routing information is potentially invalid, when proxy server 400 processes a subsequent request that includes the routing information.

In step S705, proxy server 400 forwards the request to server 421 (and the associated communication port), according to the destination identifier selected in step S704.

In step S706, server 421 returns a response including the requested network resource to proxy server 400. In step S707, proxy server 400 includes in the routing information the destination identifier of server 421, the server pool label "420," and the timestamp generated in step S704. Proxy server 400 then returns the routing information, together with the response received from server 421, to client device 410.

In step S708, client device 410 stores the routing information received from proxy server 400 as state information representing a state of connection with server 421. Client device 410 can then include the routing information in a next request for network resources.

Figure 8:
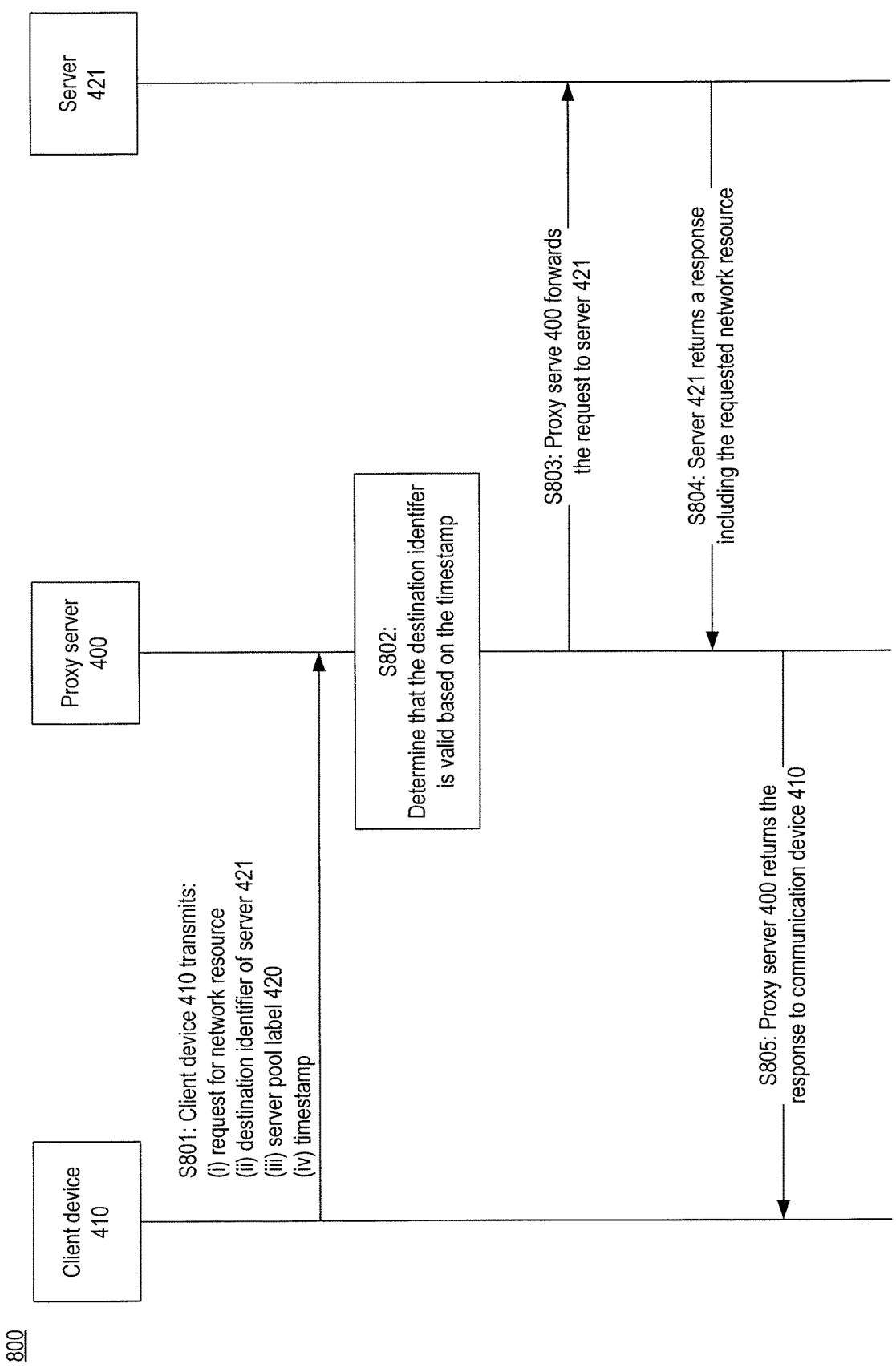

Reference is now made to FIG. 8, which illustrates an example of method 800 for processing a network request. Method 800 can be implemented among client device 410, proxy server 400, and server 421 of FIG. 4, for processing a network request that includes routing information, consistent with embodiments of the present disclosure. It is understood that the components involved in method 800 are provided only for illustration purpose, and that method 800 can be implemented between any suitable devices.

In step S801, client device 410 transmits a request for network resource to proxy server 400. The request includes routing information received from proxy server 400. In this illustrative example, the request includes routing information generated by proxy server 400 in steps S704 and S707-S708 of FIG. 7. The routing information includes a destination identifier associated with server 421, the server pool label "420," and the timestamp generated by proxy server 400 in step S704.

In step S802, upon determining that the request includes routing information, proxy server 400 determines whether the routing information is potentially invalid based on the timestamp included in the request. Proxy server 400 can compare the timestamp included in the request with an update timestamp associated with the server pool. The update timestamp can be stored in destination data storage 406 of proxy server 400. Based on a relationship between the two timestamps (e.g., the timestamp included in the request being more recent than the update timestamp by certain amount of time), proxy server 400 may determine that the routing information included in the request is up-to-date, and that the destination identifier (associated with server 421) included in the routing information can be used for forwarding the request.

In step S803, responsive to such a determination, proxy server 400 forwards the request to server 421, whose destination identifier is included in the routing information.

In step S804, server 421 returns a response including the requested network resource back to proxy server 400. In step S805, proxy server 400 returns the response to client device 410. In some embodiments, as shown in FIG. 8, when the routing information is not updated, proxy server 400 does not transmit the routing information again back to client device 410. Client device 410 will then retrieve the routing information from the locally stored state information for subsequent requests.

While method 800 illustrates a scenario where proxy server 400 correctly predicts the validity of the destination identifier included in the request based on the timestamp, it is understood that the destination identifier can still be invalid even if the timestamp included in the request is more recent than the update timestamp. For example, the server associated with the destination identifier can be out of service, and the servers' configuration and status data stored in destination data storage 406 and global information database 450 has not been updated to reflect that. In this case, after proxy server 400 forwards the request to the server and fails to receive the requested network resources within a certain time, proxy server 400 can select a new destination identifier for forwarding the request and generate a new timestamp. If and when proxy server 400 receives a response including the requested network resources, proxy server 400 can update the routing information with the new destination identifier and the new timestamp, and transmit the updated routing information back to client device 410 together with the response.

Figure 9:
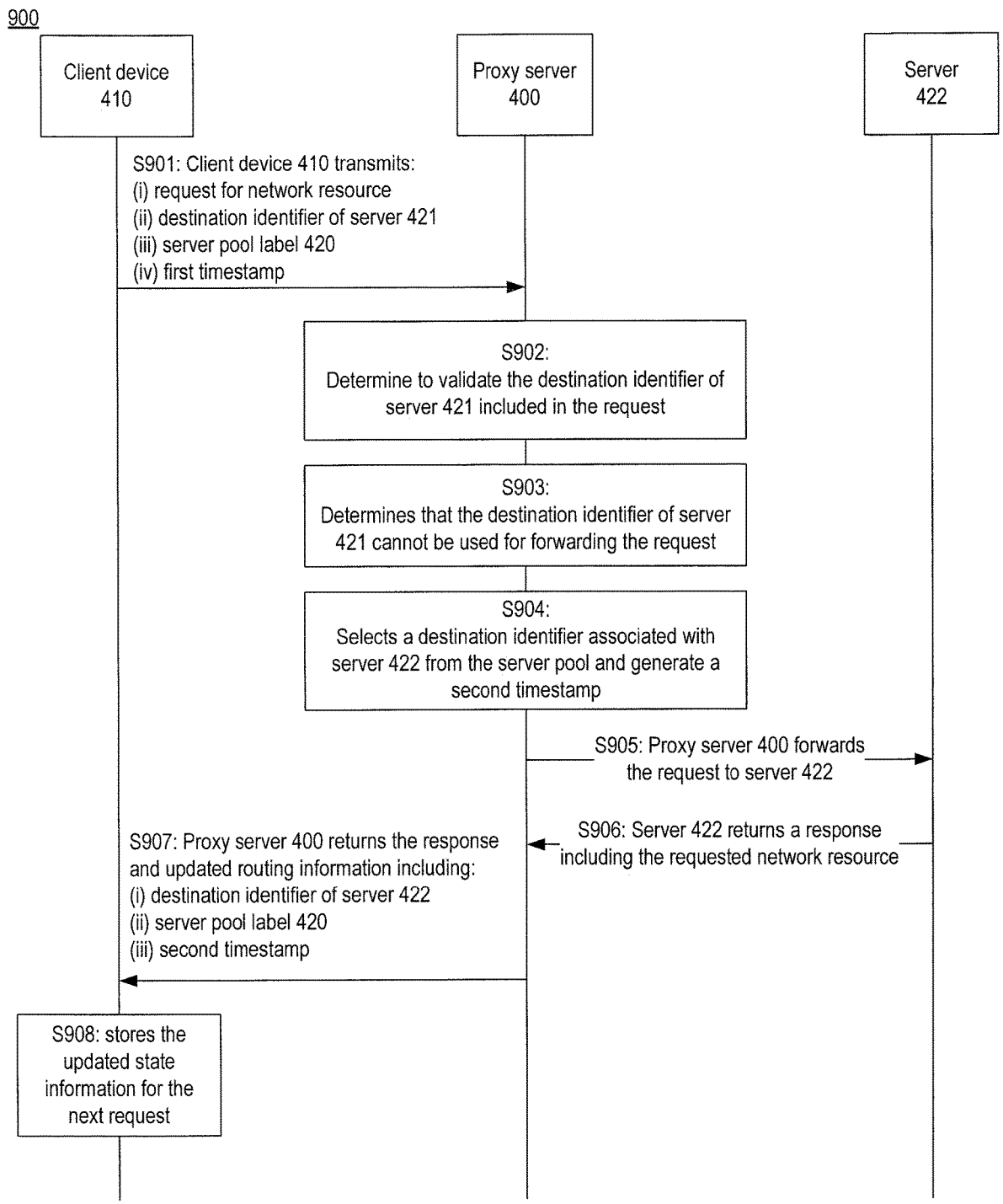

Reference is now made to FIG. 9, which illustrates an example of method 900 for processing a network request. Method 900 can be implemented among client device 410, proxy server 400, and server 422 of FIG. 4, for processing a network request that includes routing information, consistent with embodiments of the present disclosure. It is understood that the components involved in method 900 are provided only for illustration purpose, and that method 900 can be implemented between any suitable devices.

In step S901, client device 410 transmits a request for network resource to proxy server 400. In this illustrative example, the request includes routing information generated by proxy server 400 in steps S704 and S707-S708 of FIG. 7. The routing information includes a destination identifier associated with server 421, the server pool label "420," and a first timestamp generated by proxy server 400 in step S704.

In step S902, upon determining that the request includes routing information, proxy server 400 can determine whether the destination identifier included in the routing information is potentially invalid. In some cases, the determination can be made based on the first timestamp. For example, proxy server 400 can compare the first timestamp included in the request with an update timestamp stored in destination data storage 406 of proxy server 400. Based on a relationship between the two timestamps (e.g., the first timestamp is earlier than the update timestamp by certain amount of time), proxy server 400 can determine that the destination identifier included in the request is potentially invalid. For example, the server identifier associated with the server can have been changed. The server itself can also have become non-operational. Accordingly, based on the relationship between the two timestamps, proxy server 400 determines to validate the destination identifier.

The determination of the validity of the destination identifier can be performed by, for example, determining whether the destination identifier remains associated with the server pool label included in the request (if the server pool associated with the server pool label is determined to be active), or whether the destination identifier is associated with the replacement server pool label (if the server pool associated with the server pool label is determined to be inactive). For example, proxy server 400 can check table 514 to determine whether the destination identifier included in the request is still listed, and remains associated with the server pool label (e.g. server pool label "420") in the request.

In this illustrative example, proxy server 400 determines that server pool label "420" remains active, but the destination identifier included in the request (associated with server 421) is not in table 514. Accordingly, in step 903, proxy server 400 determines that the destination identifier cannot be used for forwarding the request.

In step S904, proxy server 400 chooses another destination identifier (e.g., associated with server 422) from table 514 for forwarding the request, and for updating the routing information. Proxy server 400 also generates a second timestamp to reflect a time when the routing information is updated. On the other hand, in a scenario where the destination identifier included in the request is found to be valid, the second timestamp will be generated to reflect that the routing information is up-to-date.

In step S905, proxy server 400 forwards the request to server 422, whose destination identifier will be included in the updated routing information. On the other hand, if the destination identifier of server 421 is determined to be valid in step S904, proxy server 400 will forward the request to server 421.

In step S906, server 422 (or server 421) returns a response including the requested network resource to proxy server 400. In step S907, proxy server 400 forwards the updated routing information, together with the response, to client device 410. The updated routing information may include the destination identifier of server 422 (or the destination identifier of server 421 if it is determined to be valid), the server pool label "420," and the second timestamp generated in step S904.

In step S908, client device 410 stores the updated routing information received from proxy server 400, so that it can include the updated routing information in a next request for network resources.

Figure 10:
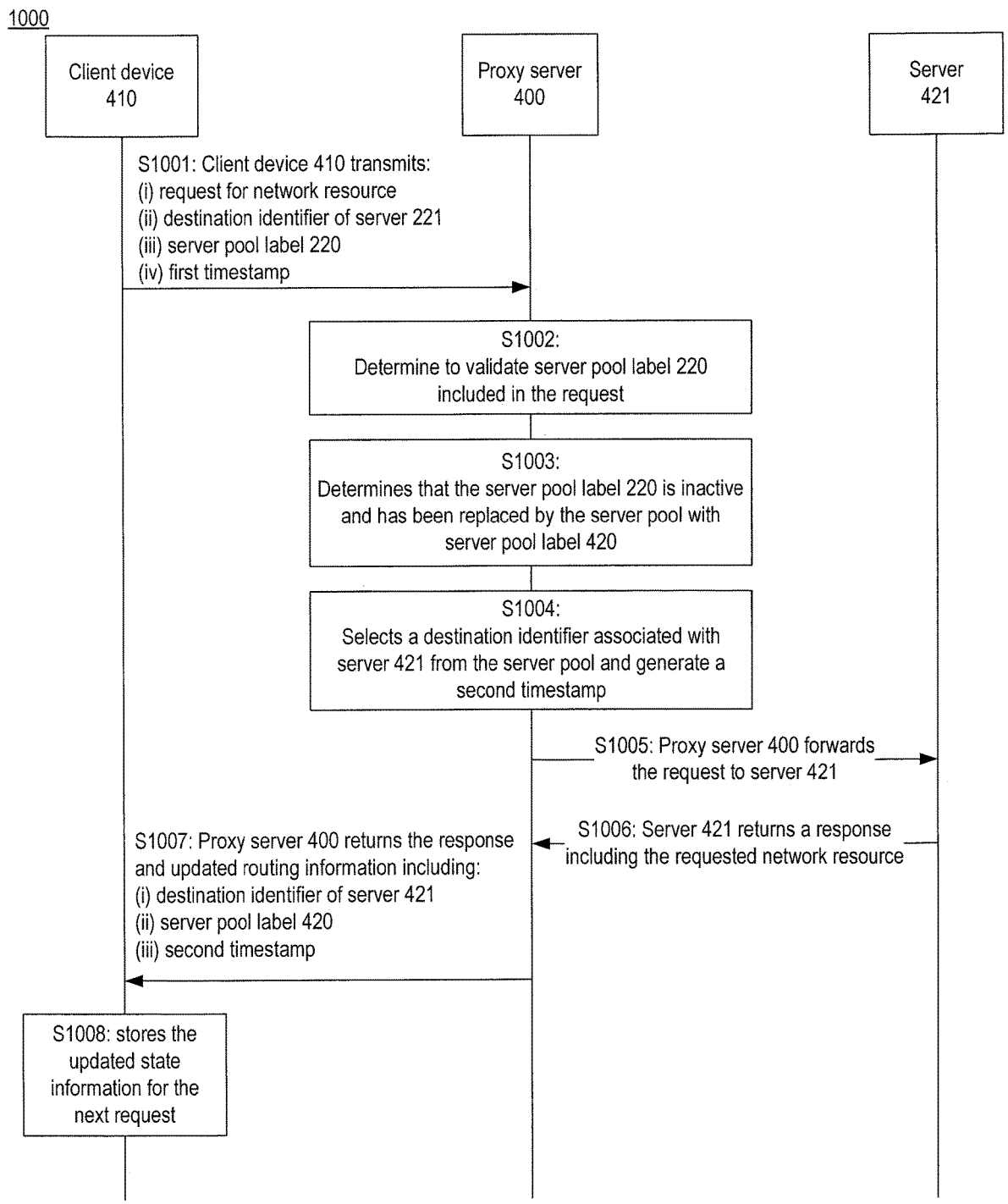

Reference is now made to FIG. 10, which illustrates an example of method 1000 for processing a network request. Method 1000 can be implemented among client device 410, proxy server 400, and server 421 of FIG. 4, for processing a network request that includes routing information, consistent with embodiments of the present disclosure. It is understood that the components involved in method 1000 are provided only for illustration purpose, and that method 1000 can be implemented between any suitable devices.

In step S1001, client device 410 transmits a request for network resource to proxy server 400. In this illustrative example, the request includes routing information comprising a destination identifier associated with a server 221, a server pool label "220" (as shown in FIG. 5), and a first timestamp that reflects the time the routing information was created or updated.

In step S1002, upon determining that the request includes routing information, proxy server 400 can determine whether the server pool label "220" included in the routing information is potentially invalid. In some cases, the determination can be made based on the first timestamp. For example, proxy server 400 can compare the first timestamp included in the request with an update timestamp 508 or, as described before, a separate timestamp associated with a pairing of active and inactive pool labels, stored in destination data storage 406 of proxy server 400. Based on a relationship between the two timestamps (e.g., the first timestamp is earlier than the update timestamp by certain amount of time), proxy server 400 may determine that the server pool label included in the request is potentially invalid. For example, as discussed before, a server pool can become inactive in a switchover situation, and the relationship between the two timestamps can indicate that a switchover situation has occurred after the routing information was generated. Accordingly, based on the relationship between the two timestamps, proxy server 400 determines to validate the server pool label.

In step S1003, proxy server 400 determines whether the server pool label included in the request (server pool label "220") is listed in active pool label entries 510 by, for example, checking the servers' configuration and status data stored in destination data storage 406 and/or global information database 450. If the server pool label included in the request is inactive, proxy server 400 can then determine to validate the destination identifier as discussed in, for example, FIG. 9. In this illustrative example, server pool label "220" is listed in one of the inactive pool label entries 512. Proxy server 400 can then determine, from the corresponding active pool label entry 510, the replacement server pool, which is server pool 420.

In step S1004, proxy server 400 chooses a destination identifier from table 514 for forwarding the request, and for updating the routing information. In this illustrative example, proxy server 400 chooses the destination identifier associated with server 421. Proxy server 400 also generates a second timestamp to reflect a time when the routing information is updated. On the other hand, in a scenario where the server pool label included in the request is found to be active, the second timestamp will also be generated to reflect that the routing information is up-to-date.

In step S1005, proxy server 400 forwards the request to server 421, whose destination identifier will be included in the updated routing information. On the other hand, if the server pool label included in the request is determined to be active in step S1003, and if the destination identifier of server 221 is also determined to be valid, proxy server 400 will forward the request to server 221.

In step S1006, server 421 (or server 221) returns a response including the requested network resource to proxy server 400. In step S1007, proxy server 400 forwards the updated routing information, together with the response, to client device 410. The updated routing information includes the destination identifier of server 421 (or the destination identifier of server 221 if it is determined to be valid), the server pool label "420" (or server pool label "220" if server pool 220 is determined to be active), and the second timestamp generated in step S1004.

In step S1008, client device 410 stores the updated routing information received from proxy server 400, so that it can include the updated routing information in a next request for network resources.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A method for processing a request for network resources in a network using an intermediate server, the method comprising:
   receiving the request from at least one endpoint, wherein the request does not include any destination identifier;
   responsive to receiving the request, determining a pool of destinations, wherein the pool of destinations includes a destination associated with a destination identifier;
   creating a timestamp; and
   transmitting, to the at least one endpoint, the destination identifier, a pool identifier, and the timestamp;
   wherein the transmission of the destination identifier, the pool identifier, and the timestamp enables the at least one endpoint to transmit the request.

2. The method of claim 1, further comprising:
   determining that the destination identifier is valid based on the timestamp; and
   in response to determining that the destination identifier is valid, forwarding the request based on the destination identifier.

3. The method of claim 1, further comprising:
   responsive to determining the pool of destinations, forwarding the request from the at least one endpoint to a destination server; and
   receiving a response from the destination server, wherein the response comprises the destination identifier.

4. The method of claim 1, wherein determining the pool of destinations is further responsive to determining that the request does not include routing information.

5. The method of claim 1, wherein determining the pool of destination comprises sending a query to a database, wherein the query comprises a type of service requested, a user key associated with the request, or a geographical location.

6. The method of claim 5, wherein the database is configured to process the request for network resources.

7. The method of claim 1, wherein the pool of destinations further comprises a label associated with the pool.

8. A non-transitory computer-readable medium storing instructions that, when executed by one or more processors, cause the one or more processers to perform operations comprising:
   receiving a request from at least one endpoint, wherein the request does not include any destination identifier;
   responsive to receiving the request, determining a pool of destinations, wherein the pool of destinations includes a destination associated with a destination identifier;
   creating a timestamp; and
   transmitting, to the at least one endpoint, the destination identifier, a pool identifier, and the timestamp;
   wherein the transmission of the destination identifier, the pool identifier, and the timestamp enables the at least one endpoint to transmit the request.

9. The non-transitory computer-readable medium of claim 8, further storing additional instructions that, when executed by the one or more processors, cause the processors to perform additional operations comprising:
   determining that the destination identifier is valid based on the timestamp; and in response to determining that the destination identifier is valid, forwarding the request based on the destination identifier.

10. The non-transitory computer-readable medium of claim 8, further storing additional instructions that, when executed by the one or more processors, cause the processors to perform additional operations comprising:
responsive to determining the pool of destinations, forwarding the request from the at least one endpoint to a destination server; and
receiving a response from the destination server, wherein the response comprises the destination identifier.

11. The non-transitory computer-readable medium of claim 8, wherein determining the pool of destinations is further responsive to determining that the request does not include routing information.

12. The non-transitory computer-readable medium of claim 8, wherein determining the pool of destination comprises sending a query to a database, wherein the query comprises a type of service requested, a user key associated with the request, or a geographical location.

13. he non-transitory computer-readable medium of claim 12, wherein the database is configured to process the request for network resources.

14. The non-transitory computer-readable medium of claim 8, wherein the pool of destinations further comprises a label associated with the pool.

15. A system, comprising:
one or more processors of an intermediary server;
a memory operatively connected to the one or more processors and storing instructions that, when executed by the one or more processors, cause the one or more processors to perform operations comprising:
receiving the request from at least one endpoint, wherein the request does not include any destination identifier;
responsive to receiving the request, determining a pool of destinations, wherein the pool of destinations includes a destination associated with a destination identifier;
creating a timestamp; and
transmitting, to the at least one endpoint, the destination identifier, a pool identifier, and the timestamp;
wherein the transmission of the destination identifier, the pool identifier, and the timestamp enables the at least one endpoint to transmit the request.

16. The system of claim 15, wherein the operations further comprise:
determining that the destination identifier is valid based on the timestamp; and
in response to determining that the destination identifier is valid, forwarding the request based on the destination identifier.

17. The system of claim 15, wherein the operations further comprise:
responsive to determining the pool of destinations, forwarding the request from the at least one endpoint to a destination server; and
receiving a response from the destination server, wherein the response comprises the destination identifier.

18. The system of claim 15, wherein determining the pool of destinations is further responsive to determining that the request does not include routing information.

19. The system of claim 15, wherein determining the pool of destination comprises sending a query to a database, wherein the query comprises a type of service requested, a user key associated with the request, or a geographical location.

20. The system of claim 15, wherein the pool of destinations further comprises a label associated with the pool.

\* \* \* \* \*